US012741465B2

(12) United States Patent
Nie et al.

(10) Patent No.: US 12,741,465 B2
(45) Date of Patent: *Sep. 22, 2026

(54) MAINTENANCE DEVICE AND INKJET RECORDING APPARATUS

(71) Applicant: KYOCERA Document Solutions Inc., Osaka (JP)

(72) Inventors: Yiquan Nie, Osaka (JP); Takashi Somete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 50 days.

This patent is subject to a terminal disclaimer.

(21) Appl. No.: 18/805,275

(22) Filed: Aug. 14, 2024

(65) Prior Publication Data

US 2025/0065626 A1 Feb. 27, 2025

(30) Foreign Application Priority Data

Aug. 22, 2023 (JP) ................................ 2023-134341

(51) Int. Cl.
*B41J 2/165* (2006.01)
*B41J 2/01* (2006.01)

(52) U.S. Cl.
CPC ........... *B41J 2/16505* (2013.01); *B41J 2/165* (2013.01); *B41J 2/16508* (2013.01); *B41J 2/16552* (2013.01); *B41J 2/01* (2013.01); *B41J 2002/16582* (2013.01)

(58) Field of Classification Search
CPC .... B41J 2/16505; B41J 2/165; B41J 2/16508; B41J 2/16552; B41J 2/01; B41J 2002/16582
See application file for complete search history.

(56) References Cited

U.S. PATENT DOCUMENTS

| | | | | |
|---|---|---|---|---|
| 6,481,824 | B1 * | 11/2002 | Hayakawa | B41J 2/16532 347/30 |
| 6,494,560 | B1 | 12/2002 | Seshimo et al. | 347/23 |
| 2002/0130918 | A1 | 9/2002 | Hayakawa et al. | 347/29 |
| 2012/0154474 | A1 * | 6/2012 | Hazeyama | B41J 2/16508 347/17 |
| 2025/0065628 | A1 * | 2/2025 | Somete | B41J 2/01 |
| 2025/0065630 | A1 * | 2/2025 | Nie | B41J 2/16508 |

FOREIGN PATENT DOCUMENTS

| | | | | |
|---|---|---|---|---|
| JP | 2007069450 | A * | 3/2007 | B41J 2/165 |
| JP | 2007283548 | A * | 11/2007 | B41J 2/165 |
| JP | 2012-131064 | A | 7/2012 | |

* cited by examiner

*Primary Examiner* — Yaovi M Ameh
(74) *Attorney, Agent, or Firm* — Stein IP, LLC

(57) ABSTRACT

The maintenance device includes a cap and a suppression member. The cap, including an air supply port and an air discharge port, is to be fitted to a nozzle surface of an inkjet head. The suppression member is opposed to the air supply port, provided between the air supply port and the nozzle surface, and separate from the air supply port and also separate from the nozzle surface.

17 Claims, 23 Drawing Sheets

MAINTENANCE DEVICE AND INKJET RECORDING APPARATUS

INCORPORATION BY REFERENCE

This application is based on and claims the benefit of priority from Japanese Patent Application No. 2023-134341 filed on Aug. 22, 2023, the contents of which are hereby incorporated by reference.

BACKGROUND

The present disclosure relates to a maintenance device for performing maintenance of inkjet heads as well as to an inkjet recording apparatus.

In an inkjet recording apparatus with use of aqueous ink, there is a possibility that moisture vaporizes from ink within nozzles during non-execution periods of printing, leading to increases in viscosity and resultantly occurrence of ejection failures or cloggings.

SUMMARY

A maintenance device according to the present disclosure includes a cap and a suppression member. The cap, including an air supply port and an air discharge port, is to be fitted to a nozzle surface of an inkjet head. The suppression member is opposed to the air supply port, provided between the air supply port and the nozzle surface, and separate from the air supply port and also separate from the nozzle surface.

Further features of the present disclosure, and the specific benefits obtained according to the present disclosure, will become more apparent from the description of embodiments as follows.

DETAILED DESCRIPTION

Hereinafter, embodiments of the present disclosure will be described. First, problems of conventional devices will be described.

Conventionally, there has been discussed a technique for suppressing vaporization of moisture from ink within nozzles. For example, there is provided a device for supplying wetted air into a cap that covers an ejection surface (nozzle surface) of a head.

However, with the conventional configuration described above, wetted air makes direct contact with the nozzle surface, making it likely that condensations occur to the nozzle surface, causing ink to be pulled up by the condensations and come out of the nozzles. Also, as wetted air is supplied through an air supply port provided in the cap, wetted air becomes less likely to reach the nozzle surface with increasing distance from the air supply port more and more, with a result that ink viscosity increases. Therefore, ink ejection performance becomes nonuniform, involving a problem that image densities deviate from image data.

In view of the above-described problem, an object of the present disclosure is firstly to prevent wetted air from making direct contact with the nozzle surface, and secondly, further preferably, to improve uniformity of humidification for the nozzle surface.

First Embodiment

Hereinafter, an inkjet recording apparatus 1 according to a first embodiment of the present disclosure will be described with reference to the accompanying drawings.

Figure 1:
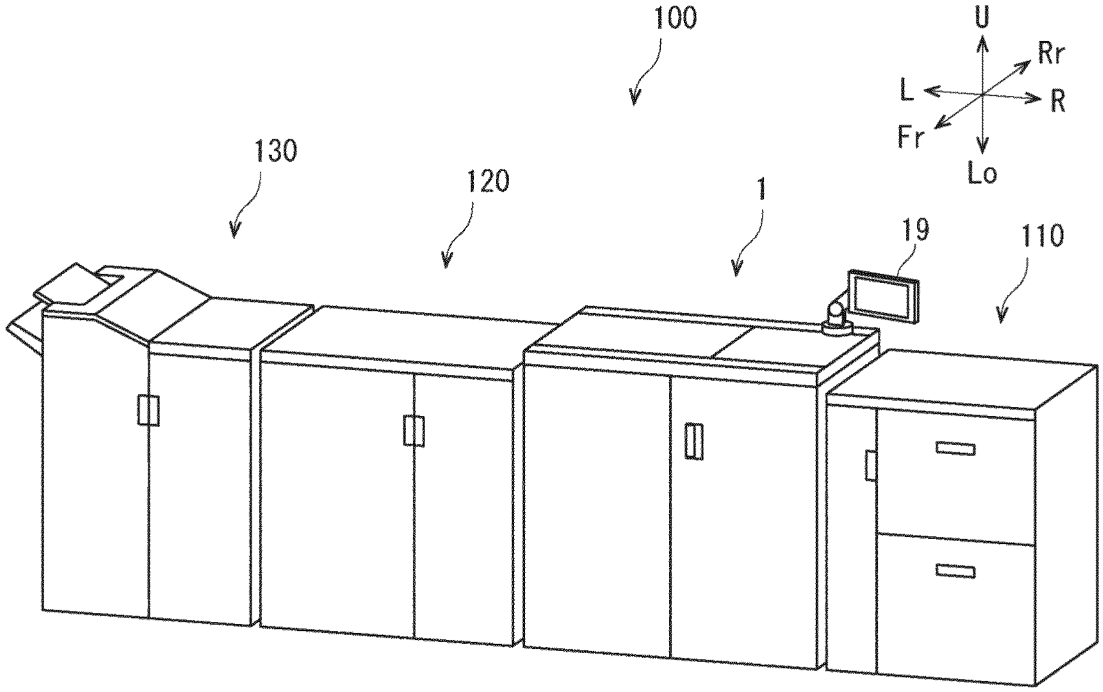
FIG. 1 is a perspective view showing an appearance of an image forming system according to a first embodiment of the present disclosure.
Figure 2:
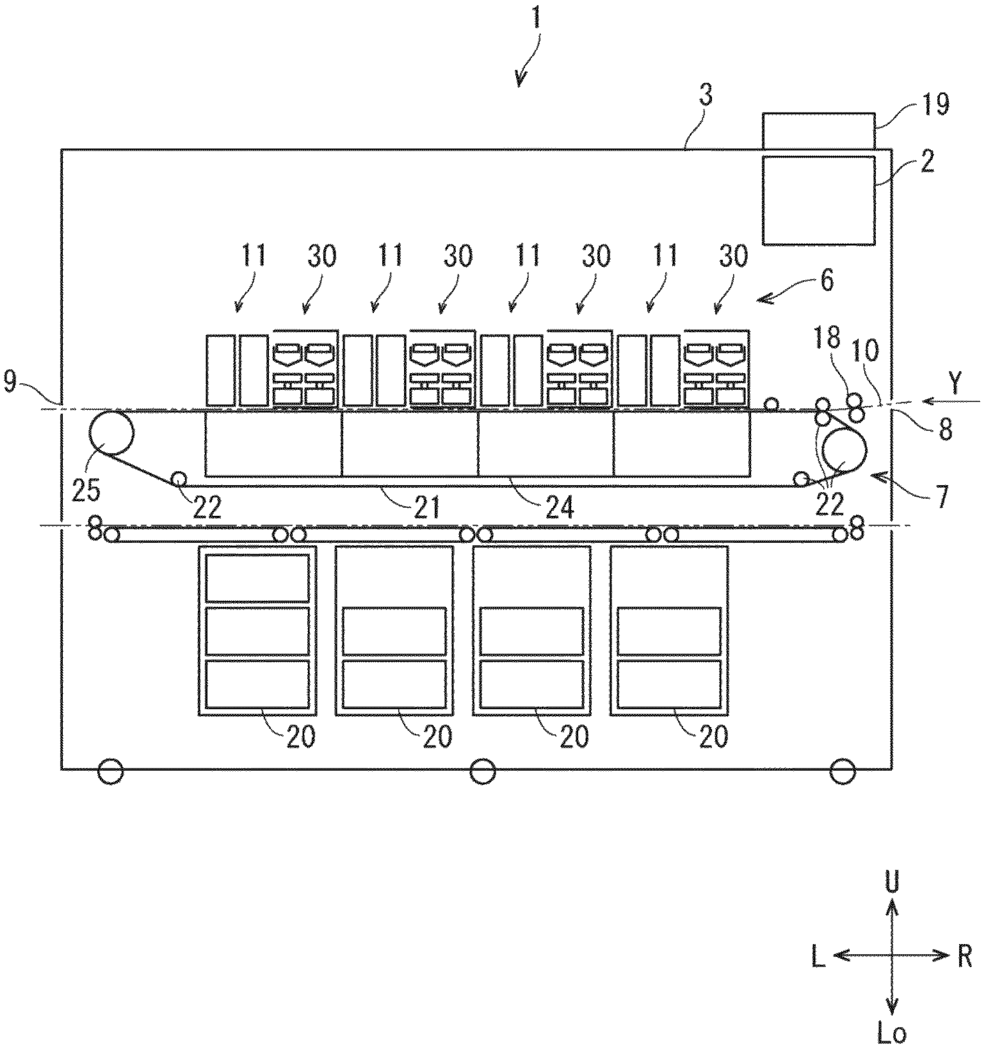
FIG. 2 is a front view schematically showing an internal configuration of an inkjet recording apparatus according to the first embodiment of the disclosure.
Figure 3:
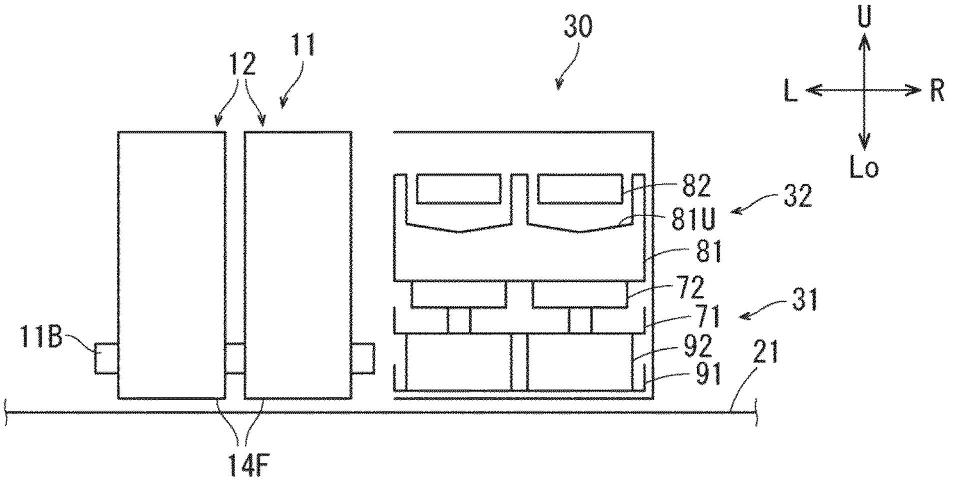
FIG. 3 is a front view schematically showing a head unit and a maintenance device according to the first embodiment of the disclosure.
Figure 4:
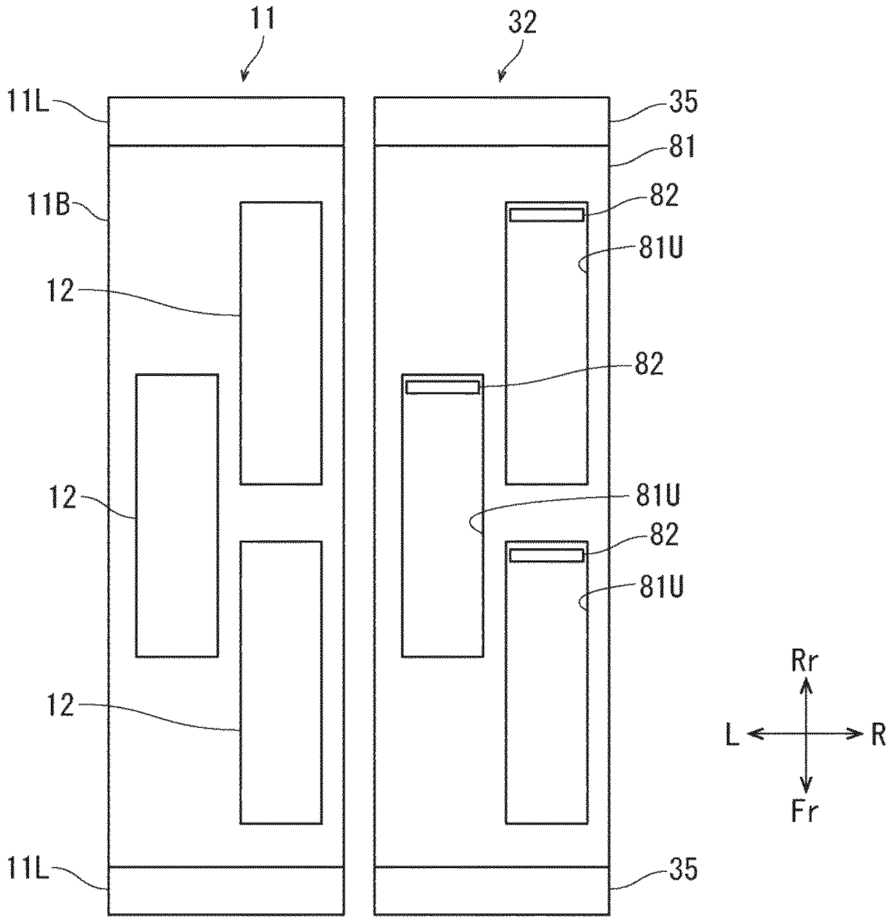
FIG. 4 is a plan view schematically showing a head unit and a wipe unit according to the first embodiment of the disclosure.
Figure 5:
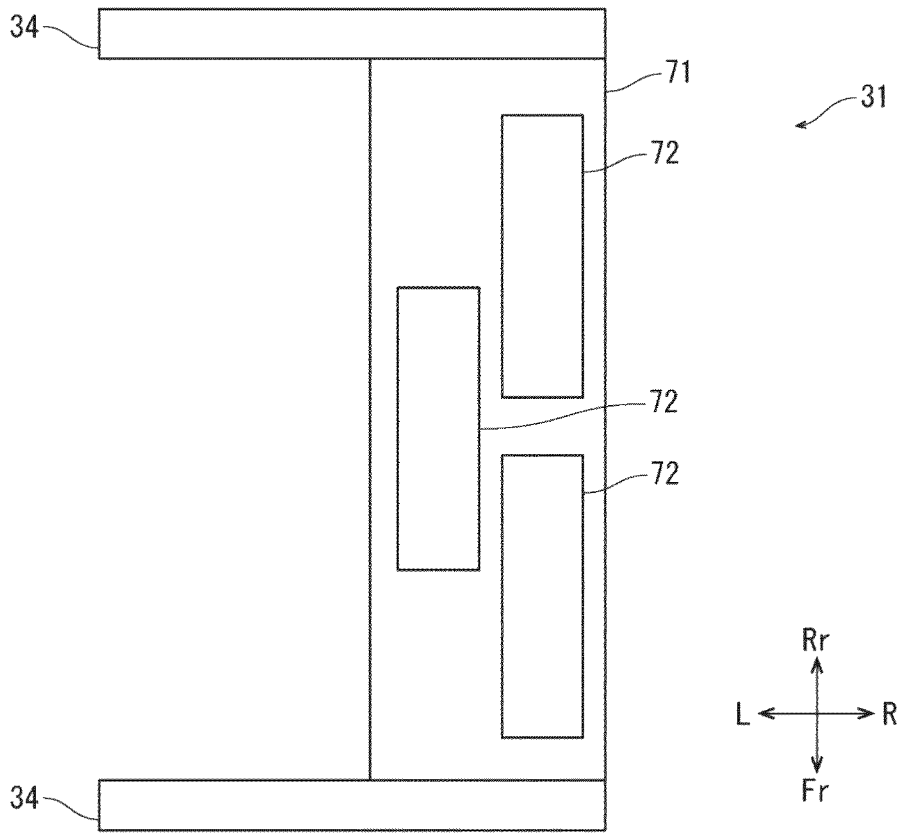
FIG. 5 is a plan view schematically showing a cap unit according to the first embodiment of the disclosure.
Figure 6:
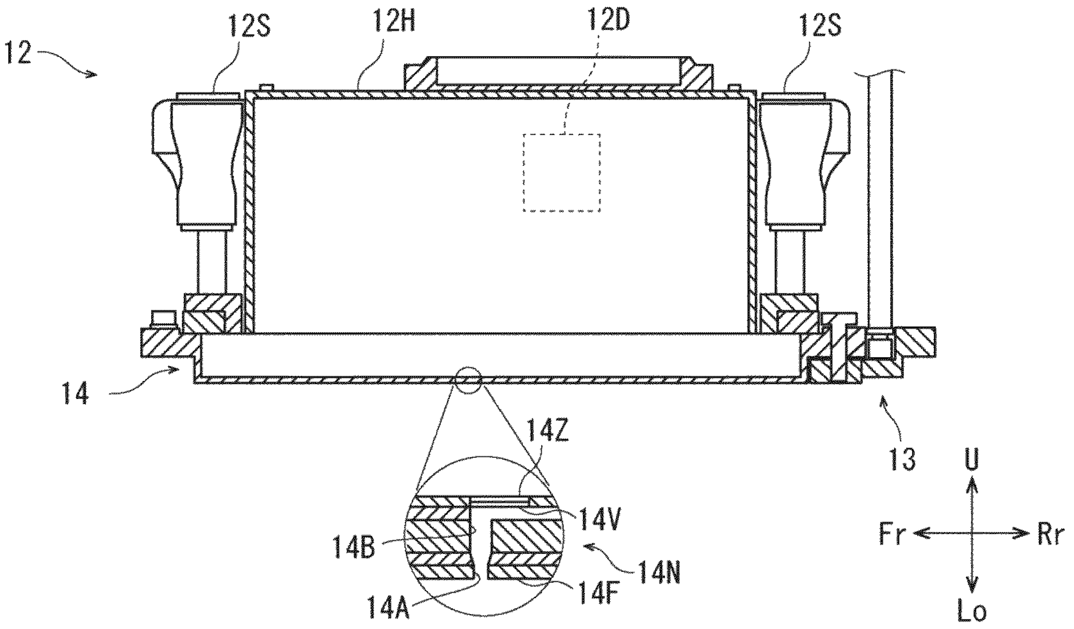
FIG. 6 is a sectional view showing an inkjet head according to the first embodiment of the disclosure.

FIG. 1 is a perspective view showing an appearance of an image forming system 100. FIG. 2 is a front view schematically showing an internal configuration of the inkjet recording apparatus 1. FIG. 3 is a front view schematically showing a head unit 11 and a maintenance device 30. FIG. 4 is a plan view schematically showing the head unit 11 and a wipe unit 32. FIG. 5 is a plan view schematically showing a cap unit 31. FIG. 6 is a sectional view showing an inkjet head 12. FIGS. 7A to 7G are front views showing operations of the maintenance device 30. Hereinafter, a drawing-sheet near side in FIG. 2 is assumed as a frontal side (forward side) of the inkjet recording apparatus 1, and left/right directions are based on directions as the inkjet recording apparatus 1 is viewed from the frontal side. In the individual figures, reference signs U, Lo, L, R, Fr, and Rr denote up, low, left, right, front, and rear, respectively.

The image forming system 100 (see FIG. 1) includes a sheet feed device 110, the inkjet recording apparatus 1, a drying device 120, and a postprocessing device 130. The sheet feed device 110, containing thousands of sheets, feeds a sheet to the inkjet recording apparatus 1. The inkjet recording apparatus 1 forms an image on the sheet by an inkjet method. The drying device 120 heats and dries the sheet conveyed up from the inkjet recording apparatus 1. The postprocessing device 130 executes punching, stapling, folding, or other processes on the sheet conveyed up from the drying device 120.

The inkjet recording apparatus 1 (see FIG. 2) includes a rectangular parallelepiped-shaped main housing 3. In central part of the main housing 3, a conveyance unit 7 for sucking and conveying the sheet in a Y direction is provided. Above the conveyance unit 7, an image forming unit 6 for ejecting ink to form an image is provided. In a right side face of the main housing 3, a sheet feed port 8 for letting in the sheet from the sheet feed device 110 is provided. In a left side face of the main housing 3, a discharge port 9 for discharging the sheet with the image formed thereon to the drying device 120 is provided. Within the main housing 3, a conveyance path 10 ranging from the sheet feed port 8, via a clearance between the conveyance unit 7 and image forming unit 6, to the discharge port 9 is provided. Upstream of the conveyance unit 7 in the conveyance direction Y, registration rollers 18 are provided.

The conveyance unit 7 includes an endless conveyor belt 21, and a suction part 24. The conveyor belt 21, having a multiplicity of vent holes (not shown), is wound and stretched over a driving roller 25 and a driven roller 22. An upper surface of the suction part 24, having a multiplicity of vent holes (not shown), is set in contact with an inner surface of the conveyor belt 21. Suction of air by the suction part 24 via the vent holes of the conveyor belt 21 and the vent holes of the suction part 24 causes the sheet to be tightly sucked to the conveyor belt 21. As the driving roller 25 is driven counterclockwise by a driving unit (not shown) including a motor and a reduction gear, the conveyor belt 21 is rotated counterclockwise, so that the sheet sucked to the conveyor belt 21 is conveyed in the conveyance direction Y.

The image forming unit 6 includes a plurality (four in this embodiment) of head units 11. Each head unit 11 (see FIGS. 3 and 4) includes one or more (three in this embodiment) inkjet heads 12. In this embodiment, an ink container 20 filled with black ink is connected to the head unit 11 for black ink. An ink container 20 filled with cyan ink is connected to the head unit 11 for cyan ink. An ink container 20 filled with magenta ink is connected to the head unit 11 for magenta ink. An ink container 20 filled with yellow ink is connected to the head unit 11 for yellow ink.

The inkjet head 12 (see FIG. 6) includes a rectangular parallelepiped-shaped casing 12H whose longitudinal direction is given by a front/rear direction, a nozzle plate 14 provided at a bottom of the casing 12H, and sockets 12S to which piping for supplying ink is connected. The nozzle plate 14 has a multiplicity of nozzles 14N arrayed in the front/rear direction. The nozzles 14N include a branch flow path 14B branching from a downstream side of the socket 12S, and an ejection port 14A provided in a nozzle surface 14F, which is a lower surface of the nozzle plate 14. A vibrating plate 14V is part of an inner wall of the branch flow path 14B. A pressurizing element 14Z is provided on a vibrating plate 14V. The pressurizing element 14Z is provided by using a piezoelectric element, an electrostatic actuator, a heater, or the like. A driving circuit for driving the pressurizing element 14Z is connected to the pressurizing element 14Z.

A controller 2 (see FIG. 2) includes an arithmetic processing part and a storage part (not shown). The arithmetic processing part is, for example, provided by a CPU (Central Processing Unit). The storage part includes storage mediums such as ROM (Read Only Memory), RAM (Random Access Memory), EEPROM (Electrically Erasable Programmable Read Only Memory), or the like. The arithmetic processing part reads and executes control programs stored in the storage part to fulfill various types of processings. In addition, the controller 2 may also be implemented by integrated circuits under nonuse of any software.

In upper part of the main housing 3, a display operation unit 19 is provided (see FIGS. 1 and 2). The display operation unit 19 includes a display panel, a touch panel layered in the display panel, and a keypad (not shown). The controller 2 instructs the display panel to display a screen representing an operational menu, statuses, or the like of the inkjet recording apparatus 1. In response to operations detected by the touch panel and the keypad, the controller 2 controls individual units of the inkjet recording apparatus 1.

Basic image forming operations of the inkjet recording apparatus 1 are as follows. Upon input of an image forming job from the display operation unit 19 or an external computer or the like to the inkjet recording apparatus 1, the sheet feed device 110 feeds out a sheet onto the conveyance path 10 through the sheet feed port 8, followed by skew correction of the sheet exercised by the rotation-halted registration rollers 18. When the registration rollers 18 have fed out the sheet to the conveyance unit 7 at a specified timing, the conveyance unit 7 conveys the sheet sucked up to the conveyor belt 21 in the Y direction. Ink is ejected from the inkjet heads 12 to the sheet to form an image thereon. The sheet with the image formed is discharged through the discharge port 9 to the drying device 120.

(Maintenance Device)

Next, the maintenance device 30 will be described. It is noted that since the four head units 11 are similar in configuration thereamong while the four maintenance devices 30 are similar in configuration thereamong, the following description will be focused on one head unit 11 and one maintenance device 30 provided rightward thereof.

The head unit 11 includes a head base 11B (see FIGS. 3 and 4) for supporting the inkjet head 12. In the head base 11B, three inkjet heads 12 are provided in a staggered pattern.

The maintenance device 30 (see FIG. 3) is provided sideward (rightward in this embodiment) of the head unit 11. The maintenance device 30 includes the cap unit 31, and the wipe unit 32.

(Cap Unit)

The cap unit 31 (see FIGS. 3 and 5) includes caps 72 equal in number (three in this embodiment) to the inkjet heads 12 included in the head unit 11. The three caps 72 are arranged in a staggered pattern, like the inkjet heads 12, and supported by a frame member 71. Two caps 72 are placed, front and rear, on a right side of a center of the frame member 71 in the left/right direction, while one cap 72 is placed on a left side. The left-side one cap 72 is placed at an intermediate position in the front/rear direction between the right-side two caps 72.

(Wipe Unit)

The wipe unit 32 (see FIGS. 3 and 4) includes a waste-liquid tray 81, and a cleaning member 82. The waste-liquid tray 81 has recessed portions 81U equal in number to the inkjet heads 12 included in the head unit 11. The plurality of recessed portions 81U are arranged in a staggered pattern like the inkjet heads 12. The cleaning member 82 is provided for each of the recessed portions 81U. The cleaning member 82 is, for example, a blade. The waste-liquid tray 81 includes a driving part (not shown) for making the cleaning member 82 slid along the nozzle surface 14F. The waste-liquid tray 81 is mounted on a plurality of caps 72. In other words, the wipe unit 32 is mounted on the cap unit 31. In each head unit 11, a cleaning-liquid supply device 13 (see FIG. 6) for supplying cleaning liquid to the nozzle surface 14F.

(Head Up/Down Unit)

A head up/down unit 11L (see FIG. 4) is provided in front and rear of the head base 11B. The head up/down unit 11L is provided by, for example, ball screws, belt driving device, or the like. The head up/down unit 11L moves the head unit 11 up and down between an image forming position and a retracted position. The image forming position (see FIG. 7A) is a position where a distance between the conveyance path 10 (upper face of conveyor belt 21) for sheet conveyance and the nozzle surface 14F comes to a specified distance suited for image formation. The image forming position is a lower-limit position of an up/down range of the head unit 11 by the head up/down unit 11L. The retracted position (see FIG. 7B) is a position where the head unit 11 does not intervene with the wipe unit 32 when the cap unit 31 and the wipe unit 32 are slid by using a later-described cap slide unit 34. The retracted position is an upper-limit position of the up/down range of the head unit 11.

(Cap Slide Unit)

The cap slide unit 34 (see FIG. 5) is provided at front and rear of the frame member 71 of the cap unit 31. The cap slide unit 34 is provided by, for example, ball screws, belt driving device, or the like. The cap slide unit 34 makes the cap unit 31 slid between a home position and a maintenance position. The home position (see FIG. 7A) is a position rightward of the head unit 11 positioned in the image forming position. The maintenance position (see FIG. 7F) is a position under the head unit 11 positioned in the retracted position.

(Wipe Up/Down Unit)

A wipe up/down unit 35 (see FIG. 4) is provided at front and rear of the waste-liquid tray 81 of the wipe unit 32. The wipe up/down unit 35 is provided by, for example, ball screws, belt driving device, or the like (not shown). The wipe up/down unit 35 makes the wipe unit 32 moved up and down between a contact position where the waste-liquid tray 81 is in contact with the cap 72 (see FIG. 7B) and a separate position where the waste-liquid tray 81 is separate to a specified distance from the cap 72 (see FIG. 7E).

Figure 8:
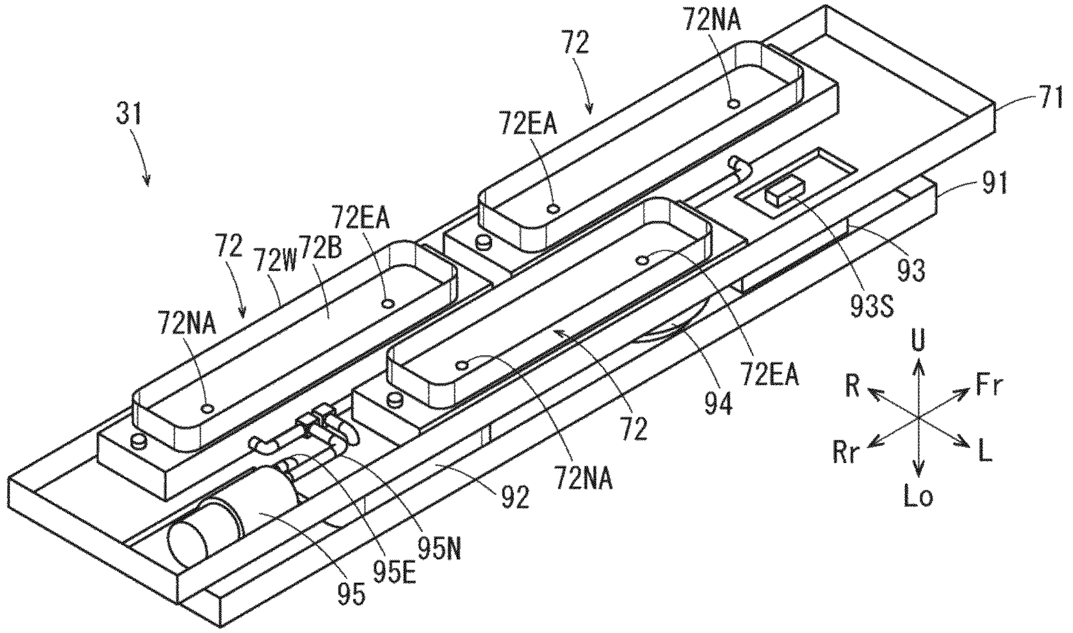
FIG. 8 is a perspective view showing the cap unit according to the first embodiment of the disclosure.
Figure 9:
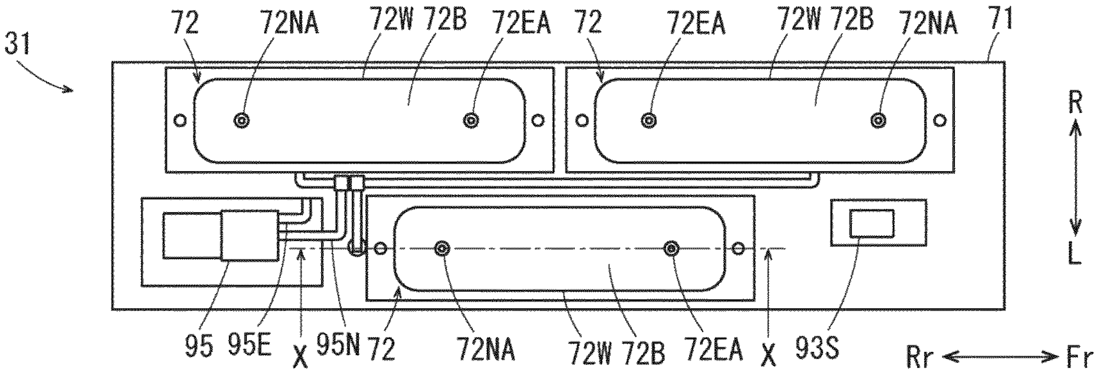
FIG. 9 is a plan view showing the cap unit according to the first embodiment of the disclosure.
Figure 10:
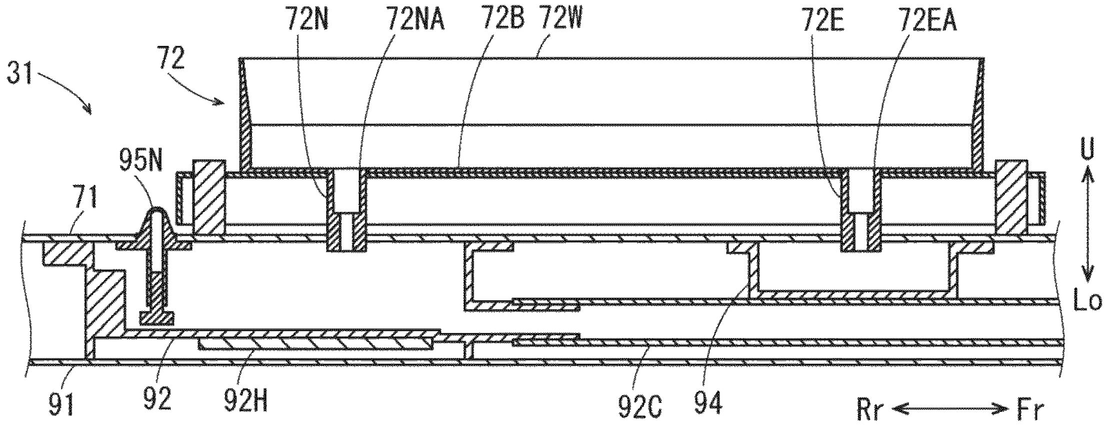
FIG. 10 is a sectional view showing a X-X cross section of FIG. 9.
Figure 11:
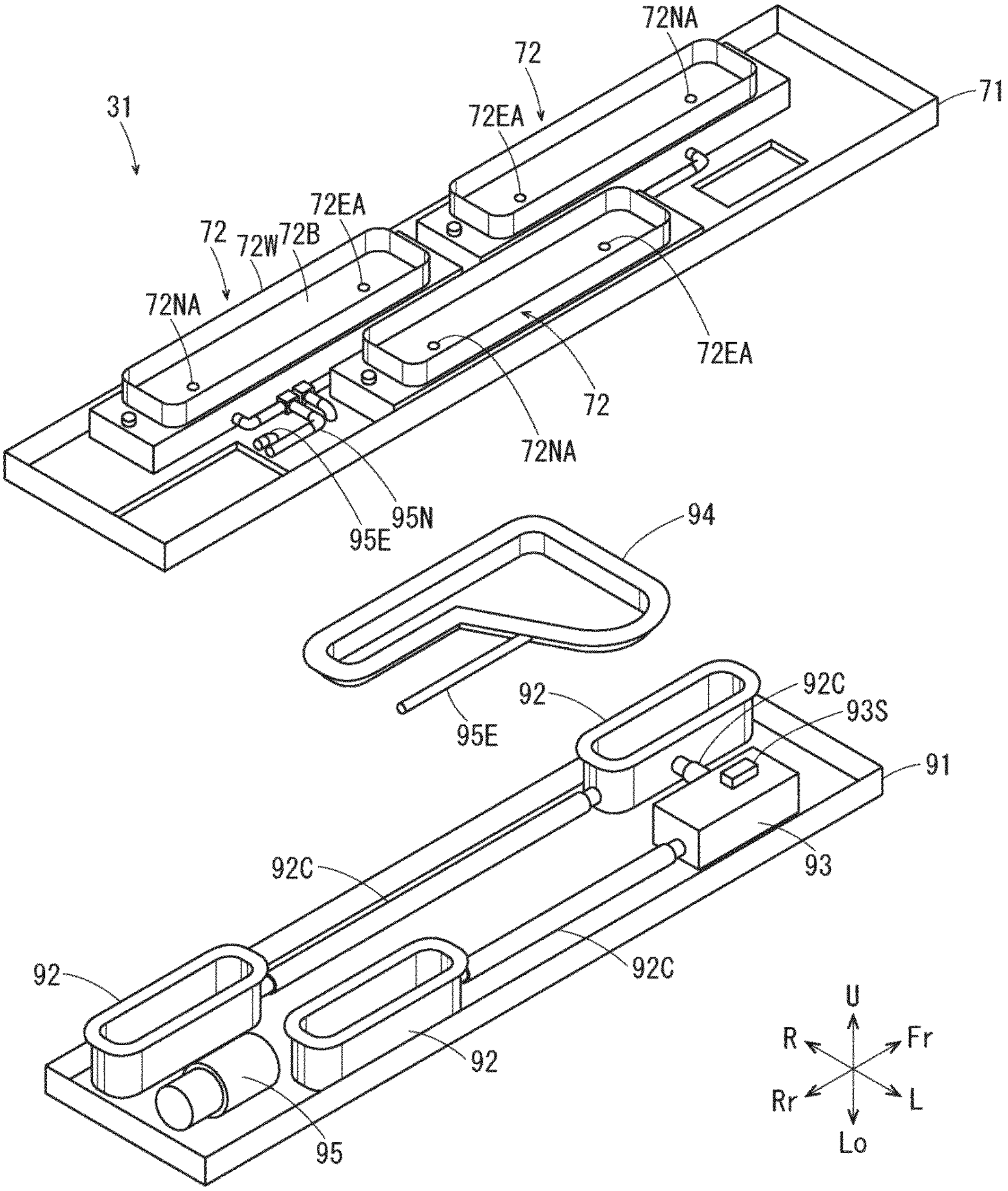
FIG. 11 is an exploded view showing the cap unit according to the first embodiment of the disclosure.
Figure 12:
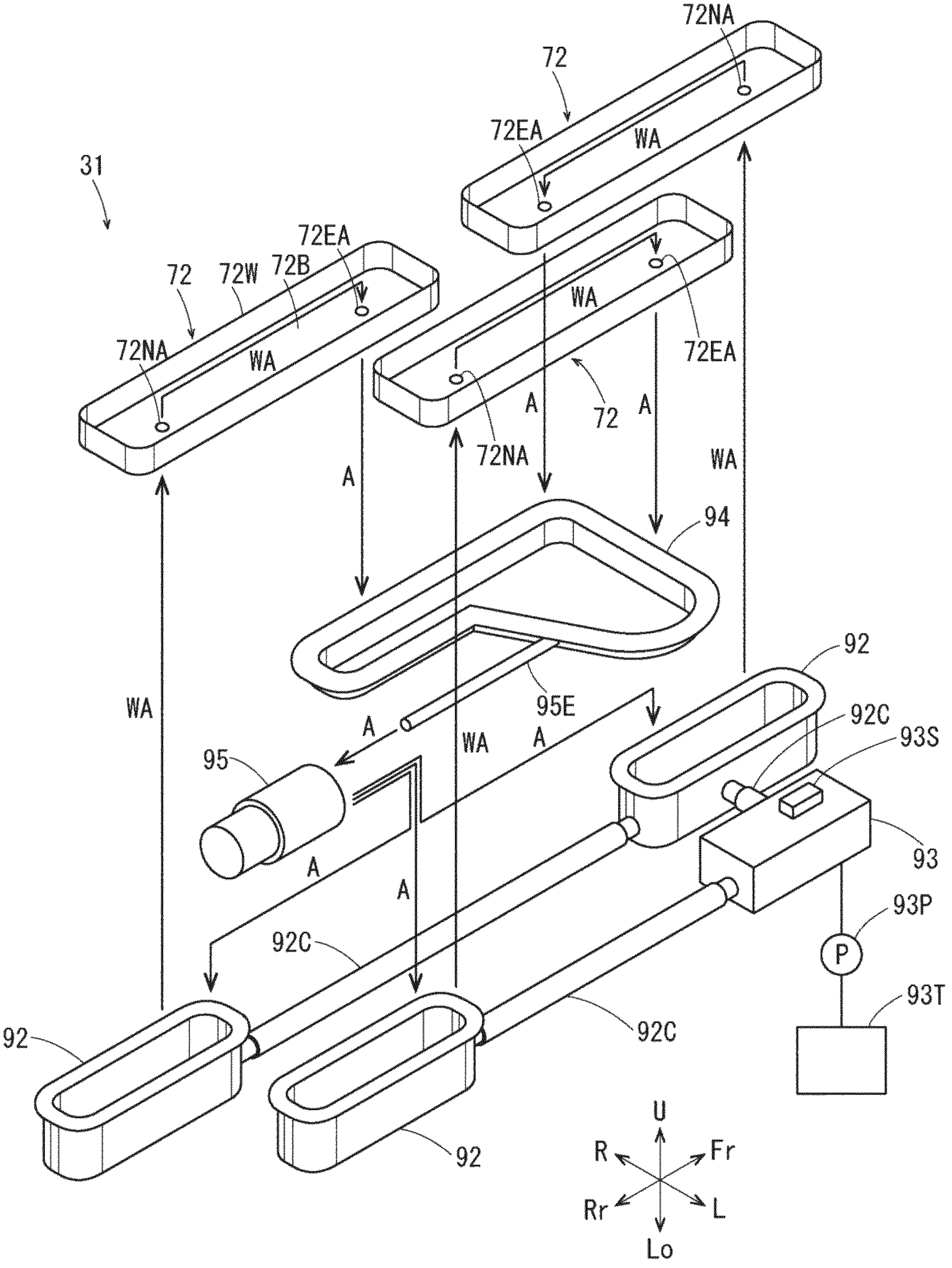
FIG. 12 is a view showing flows of air and wetted air in the cap unit according to the first embodiment of the disclosure.
Figure 13:
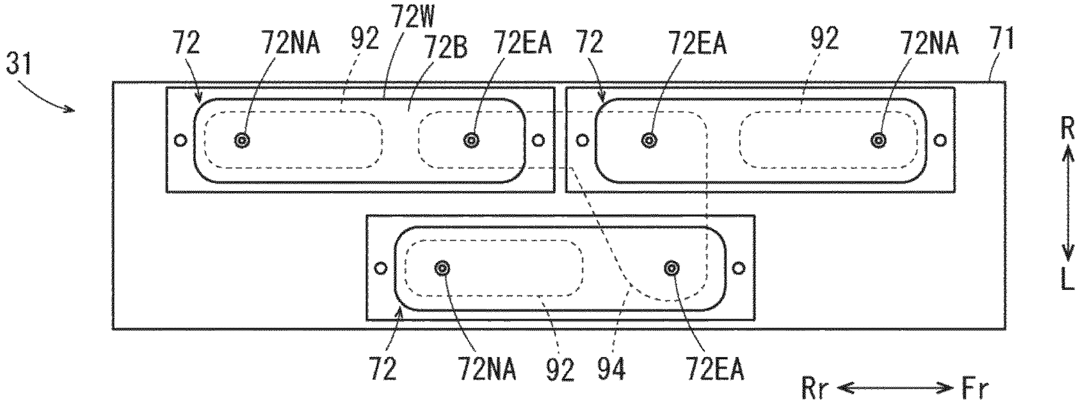
FIG. 13 is a plan view showing positions of wetting tanks and a collection tank according to the first embodiment of the disclosure.
Figure 14:
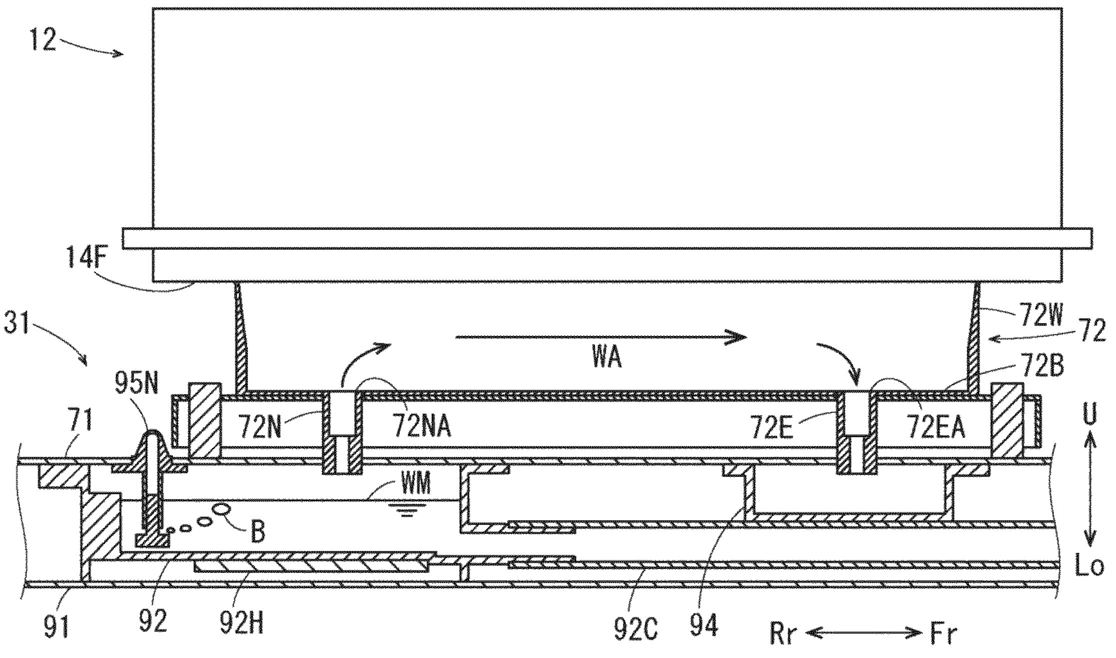
FIG. 14 is a sectional view showing a flow of wetted air in the cap according to the first embodiment of the disclosure.

Next, a configuration of the cap unit 31 will be detailed. FIG. 8 is a perspective view showing the cap unit 31. FIG. 9 is a plan view showing the cap unit 31. FIG. 10 is a sectional view showing a X-X cross section of FIG. 9. FIG. 11 is an exploded view showing the cap unit 31. FIG. 12 is a view showing flows of air A and wetted air WA in the cap unit 31. FIG. 13 is a plan view showing positions of wetting tanks 92 and a collection tank 94. FIG. 14 is a sectional view showing a flow of wetted air WA in the cap 72.

(Cap)

Each cap 72 (see FIGS. 8 to 10) is formed into an upwardly-opened box shape. The cap 72 includes a generally rectangular bottom portion 72B with its longitudinal direction along the front/rear direction, and a side wall portion 72W vertically erected from edges of the bottom portion 72B. The side wall portion 72W is formed from rubber or other flexible material. In the bottom portion 72B, an air supply port 72NA and an air discharge port 72EA are provided. In the right-and-rear side and left side caps 72, the air supply port 72NA is provided on the rear side, while the air discharge port 72EA is provided on the front side. In the right-and-front side cap 72, the air supply port 72NA is provided on the front side, while the air discharge port 72EA is provided on the rear side.

(Wetting Tanks, Collection Tank)

Under the frame member 71 (see FIGS. 8 and 11 to 13), wetting tanks 92 equal in number (three in this embodiment) to the caps 72, and one collection tank 94, are provided. The wetting tanks 92 and the collection tank 94 are supported by a frame member 91. Each wetting tank 92 is placed under the air supply port 72NA of the cap 72. The collection tank 94, having such a shape as to contain all the air discharge ports 72EA as viewed in a plan view, is placed under all the air discharge ports 72EA.

An air supply pipe 72N (see FIG. 10) for communicating the cap 72 and the wetting tanks 92 placed thereunder with each other is connected to the air supply port 72NA of each cap 72. An air discharge pipe 72E for communicating the cap 72 and the collection tank 94 with each other is connected to the air discharge port 72EA of each cap 72. That is, three air discharge pipes 72E are communicated with the collection tank 94.

An air pump 95 is connected to the collection tank 94 by a collection flow path 95E (see FIGS. 8, 9, 11), and also connected to all the wetting tanks 92 by an air supply flow path 95N. The air pump 95 collects air A from the collection tank 94 via the collection flow path 95E, and supplies the collected air A to all the wetting tanks 92 via the air supply flow path 95N (see FIG. 12).

All the wetting tanks 92 are connected to a wetting sub-tank 93 via communicating pipes 92C (see FIGS. 10, 11, 12). A wetting-medium tank 93T and a wetting-medium pump 93P are connected to the wetting sub-tank 93. A wetting medium WM (see FIG. 14) is stored in the wetting-medium tank 93T. The wetting medium WM is, for example, water. The wetting-medium pump 93P supplies the wetting medium WM from the wetting-medium tank 93T to the wetting sub-tank 93. In the wetting sub-tank 93, a liquid level sensor 93S (see FIGS. 8, 9, 11) for sensing a liquid level within the wetting sub-tank 93 is provided. In each wetting tank 92, a heater 92H (see FIG. 10) for heating the wetting medium WM is provided.

Next, basic operations of the maintenance device 30 will be described. In an initial state (see FIG. 7A), each head unit 11 is positioned in the image forming position, and each cap unit 31 is positioned in the home position. The wipe unit 32 is mounted on the cap unit 31. That is, the waste-liquid tray 81 is in contact with the cap 72. The controller 2 executes processings shown below at specified timings. The terms ‘specified timing’ refers to, for example, a timing when a viscosity increase of ink within the nozzles 14N is predicted, and more concretely to such cases as a period in which image-formation jobs are not executed has continued for a specified period.

Figure 7A:
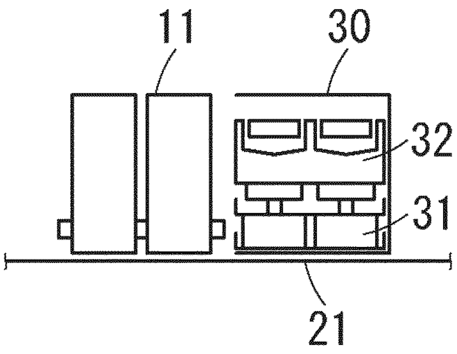
FIG. 7A is a front view showing an operation of the maintenance device according to the first embodiment of the disclosure.
Figure 7B:
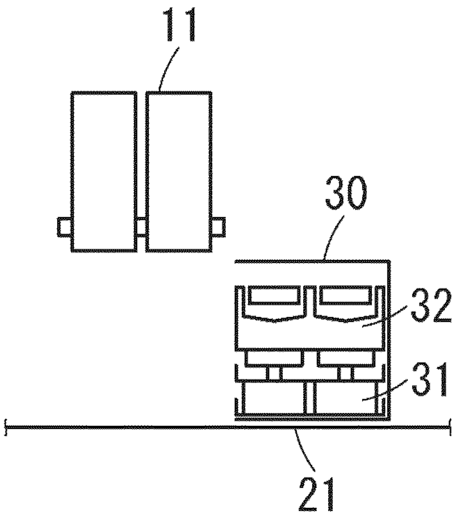
FIG. 7B is a front view showing an operation of the maintenance device according to the first embodiment of the disclosure.

First, the controller 2 activates the head up/down unit 11L so as to move up the head unit 11 to the retracted position (see FIG. 7B). Next, the controller 2 activates the cap slide unit 34 so as to make the cap unit 31 slid to the maintenance position (see FIG. 7C). In this case, since the wipe unit 32 is mounted on the cap unit 31, the wipe unit 32 is also slid to the maintenance position along with the cap unit 31. Next, the controller 2 activates the head up/down unit 11L so as to move down the head unit 11 until the nozzle surface 14F come into contact with the cleaning member 82 (see FIG. 7D).

Next, the controller 2, after forcedly ejecting a specified amount of ink from the inkjet heads 12, supplies the cleaning liquid to the nozzle surface 14F and makes the cleaning member 82 slid along the nozzle surface 14F. Then, the ink remaining on the nozzle surface 14F is diluted with the cleaning liquid, so that waste liquid containing the ink and the cleaning liquid is scraped off by the cleaning member 82, dropping onto the waste-liquid tray 81.

Figure 7C:
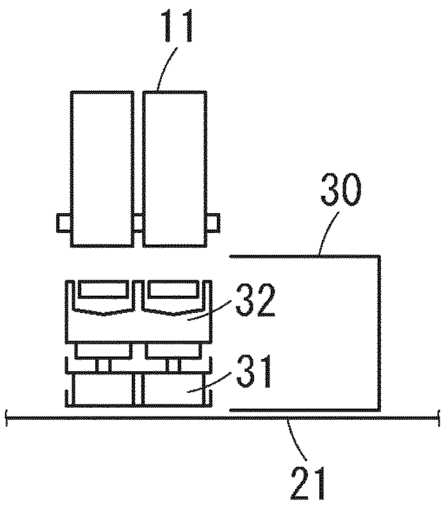
FIG. 7C is a front view showing an operation of the maintenance device according to the first embodiment of the disclosure.
Figure 7D:
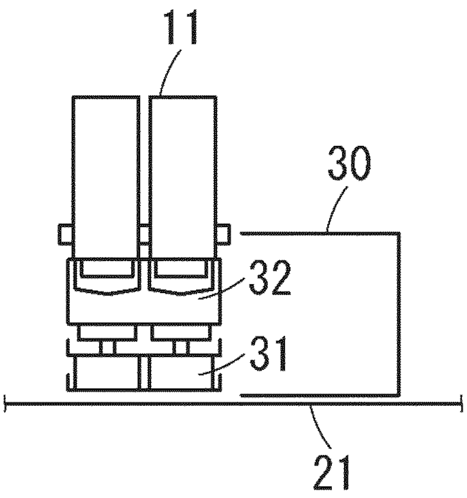
FIG. 7D is a front view showing an operation of the maintenance device according to the first embodiment of the disclosure.

Next, the controller 2 activates the head up/down unit 11L so as to move up the head unit 11 to the retracted position (see FIG. 7C). Next, the controller 2 activates the cap slide unit 34 so as to make the cap unit 31 and the wipe unit 32 slid to the home position (see FIG. 7B).

Figure 7E:
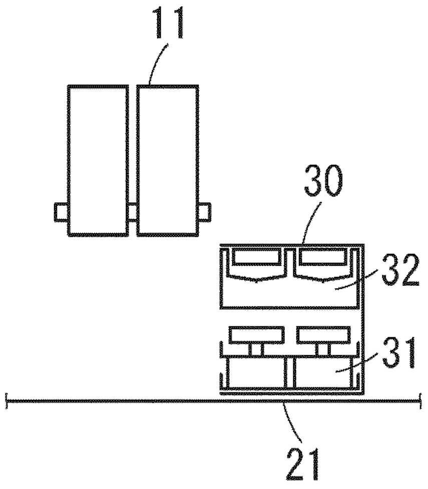
FIG. 7E is a front view showing an operation of the maintenance device according to the first embodiment of the disclosure.
Figure 7F:
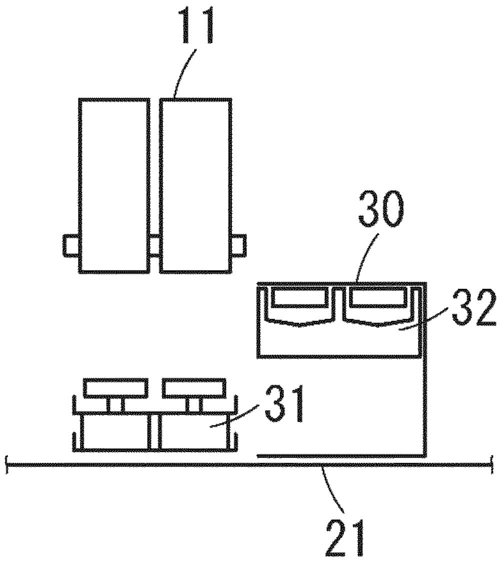
FIG. 7F is a front view showing an operation of the maintenance device according to the first embodiment of the disclosure.

Next, the controller 2 activates the wipe up/down unit 35 so as to move up the wipe unit 32 to the separate position (see FIG. 7E). Next, the controller 2 activates the cap slide unit 34 so as to make the cap unit 31 slid to the maintenance position (see FIG. 7F). In this case, since the wipe unit 32 is separate from the cap unit 31, the wipe unit 32 remains in the home position while only the cap unit 31 is slid to the maintenance position.

Figure 7G:
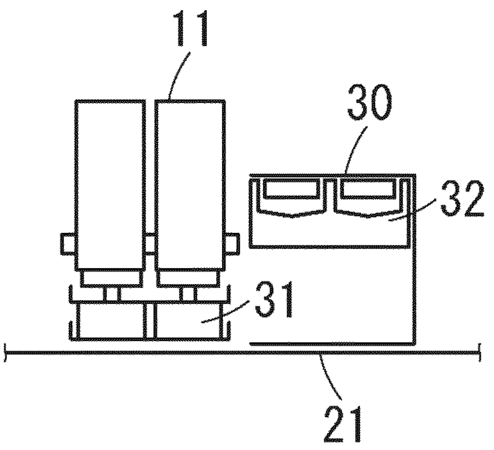
FIG. 7G is a front view showing an operation of the maintenance device according to the first embodiment of the disclosure.

Next, the controller 2 activates the head up/down unit 11L so as to move down the head unit 11 to such a height that the nozzle surface 14F comes into contact with the cap 72 (see FIG. 7G). In this way, the cap 72 is fitted to the nozzle surface 14F.

Next, the controller 2 humidifies interior of the cap 72. The controller 2 monitors measured values by the liquid level sensor 93S so that the height of the liquid level within the wetting sub-tank 93 is maintained within a specified range. More specifically, when a measured value of the liquid level has become below the specified range, the controller 2 resupplies a specified amount of wetting medium WM from the wetting-medium tank 93T to the wetting sub-tank 93 by using the wetting-medium pump 93P. Since the wetting sub-tank 93 is communicated with the wetting tanks 92 by the communicating pipes 92C, liquid levels of the wetting medium WM in the wetting sub-tank 93 and all the wetting tanks 92 become uniform in height.

The air pump 95 (see FIG. 12) collects air A from the collection tank 94 via the collection flow path 95E, and supplies the collected air A to all the wetting tanks 92 via the air supply flow path 95N. An end portion of the air supply flow path 95N on one side closer to the wetting tank 92 is placed below the liquid level of the wetting medium WM (see FIG. 14). Therefore, in the wetting tanks 92, air A is blown into the wetting medium WM, causing foams B to be generated. Before the foams B float up to the liquid level, vapor pressure of the foams B increases. Also, the wetting medium WM in the wetting tanks 92 has been heated by the heaters 92H, so that water vapor is more likely to be generated. Therefore, space above the liquid level of each wetting tank 92 is filled with the wetted air WA of increased vapor pressure, with a result that the wetted air WA flows into the cap 72 through the air supply pipe 72N.

Meanwhile, in the collection tank 94, air A is sucked up by the air pump 95, with a negative pressure generated. Therefore, in the cap 72, an air stream of wetted air WA directed from the air supply port 72NA toward the air discharge port 72EA is generated. Also, since the wetted air WA heated by the heater 92H is supplied to the cap 72, there occurs convection in the cap 72, so that high-temperature wetted air WA is supplied to the nozzle surface 14F. In this way, the wetted air WA is put into contact with the ink within the nozzles 14N, so that viscosity increase of the ink is suppressed.

In a case where an image forming job is executed, the controller 2 activates the head up/down unit 11L to move up the head unit 11 to the retracted position (see FIG. 7F), activates the cap slide unit 34 to slide the cap unit 31 to the home position (see FIG. 7E), and activates the wipe up/down unit 35 to move down the wipe unit 32 to the contact position (see FIG. 7B). Then, the controller 2 activates the head up/down unit 11L to move down the head unit 11 to the image forming position, executing the image forming job.

The wetted air WA having flowed into the cap 72 through the air supply pipe 72N goes up toward the nozzle surface 14F, so that the wetted air WA makes direct contact with the nozzle surface 14F. In such a case, condensations are generated on the nozzle surface 14F, so that ink may be pulled up by the condensations so as to go out of the nozzles 14N. Dropped ink may be deposited within the caps 72, making a cause of blocking the flow of the wetted air WA or clogging the air supply pipe 72N.

Figure 15:
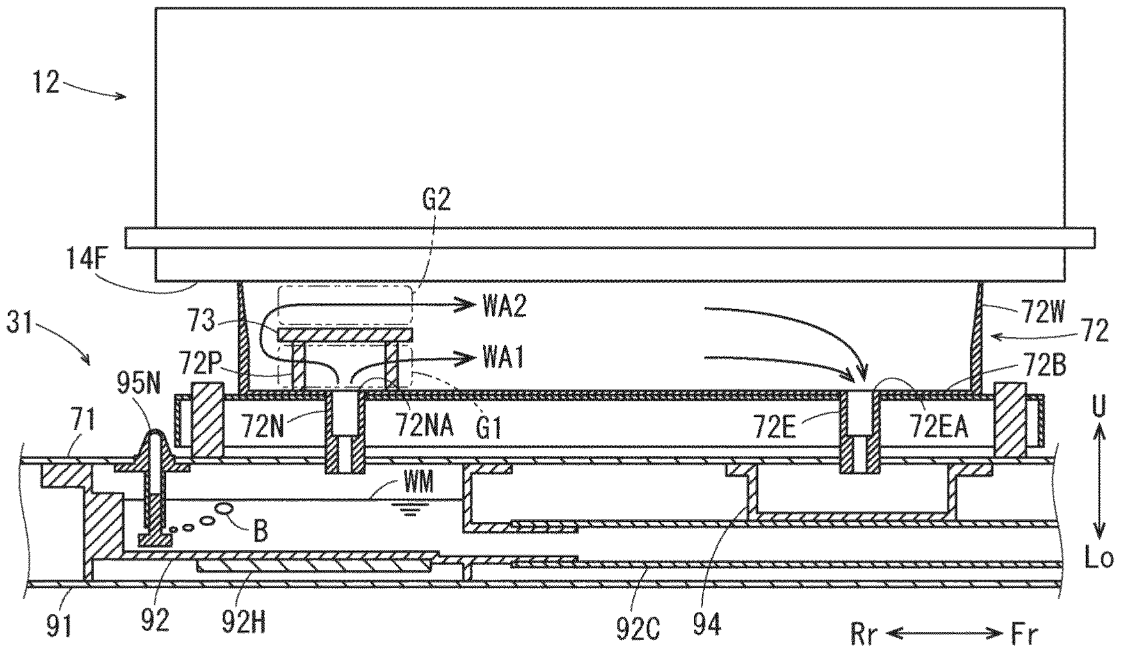
FIG. 15 is a sectional view showing a cap unit equipped with a suppression member according to the first embodiment of the disclosure.
Figure 16:
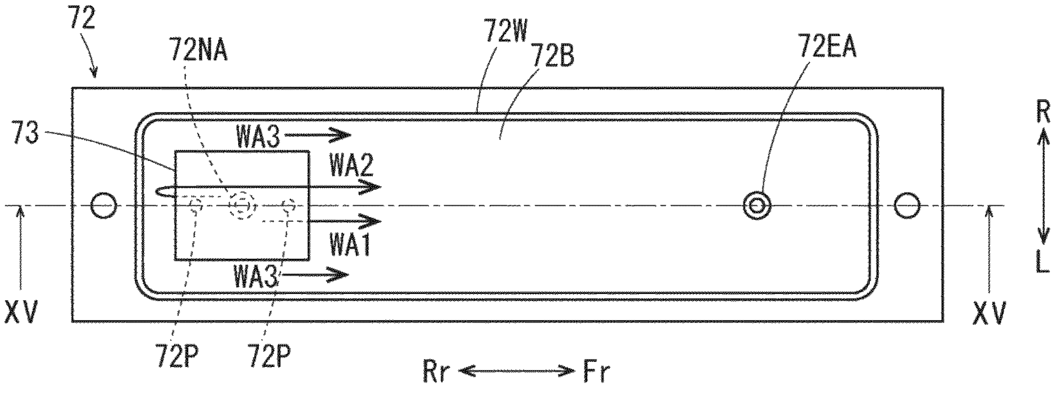
FIG. 16 is a plan view showing a cap equipped with the suppression member according to the first embodiment of the disclosure.

Accordingly, the maintenance device 30 according to this embodiment includes a suppression member 73. FIG. 15 is a sectional view showing a cap unit 31 equipped with the suppression member 73. FIG. 16 is a plan view showing the cap 72 equipped with the suppression member 73. In addition, FIG. 15 is a sectional view showing a XV-XV cross section of FIG. 16.

The maintenance device 30 according to this embodiment includes the cap 72 to be fitted to the nozzle surface 14F of the inkjet head 12, the air supply port 72NA provided in the cap 72, and the suppression member 73 provided at least between the air supply port 72NA and the nozzle surface 14F. The suppression member 73 is separate from the air supply port 72NA and also separate from the nozzle surface 14F. A first clearance G1 exists between the suppression member 73 and the air supply port 72NA, and a second clearance G2 exists between the suppression member 73 and the nozzle surface 14F. More details are as follows.

The suppression member 73 is provided above the air supply port 72NA. The suppression member 73 is separate from the air supply port 72NA and also separate from the nozzle surface 14F. The suppression member 73 is a plate-shaped member whose thicknesswise direction is along the up/down direction and which is formed from resin. The suppression member 73 is supported by a pillar 73P provided at the bottom portion 72B of the cap 72. The suppression member 73 is opposed to the air supply port 72NA. The suppression member 73 is larger in front/rear- and left/right-direction sizes than the air supply port 72NA. The suppression member 73 is provided so as to cover at least the whole air supply port 72NA, as viewed in a plan view. The first clearance G1 is provided between the air supply port 72NA and a lower surface of the suppression member 73. The second clearance G2 is provided between the nozzle surface 14F and an upper surface of the suppression member 73.

One portion WA1 of wetted air (see FIG. 15) that has flowed through the air supply port 72NA into the cap 72 flows forward from the first clearance G1 so as to be sucked into the air discharge port 72EA. Another portion WA2 of wetted air, passing from the first clearance G1 through behind the suppression member 73, goes around to the second clearance G2, flowing forward from the second clearance G2 so as to be sucked into the air discharge port 72EA. Another portion WA3 of wetted air (see FIG. 16) flows forward from left/right spaces of the suppression member 73, being sucked into the air discharge port 72EA. That is, since wetted air WA flows along the lower surface and upper surface of the suppression member 73, the wetted air WA is kept from direct contact with the nozzle surface 14F placed upward of the air supply port 72NA. As a result, generation of condensations on the nozzle surface 14F is suppressed, so that ink can be prevented from being pulled up out of the nozzles 14N by condensations.

Reasons of the suppression member 73 being formed from resin are as follows. Due to deprivation of heat from the wetted air WA by the suppression member 73, condensations may be generated on the suppression member 73. In particular, in this embodiment, since each wetting tank 92 is equipped with the heater 92H to increase vapor quantity of the wetted air WA, condensations are more likely to be generated. Generation of condensations causes vapor pressure of the wetted air WA to lower, leading to degradation of the humidifying effect for ink within the nozzles 14N. In terms of suppressing condensations, it is desirable to form the suppression member 73 from a material of low thermal conductivity. Generally, resin, being lower in thermal conductivity than metal, is suitable for the material of the suppression member 73.

According to the maintenance device 30 complying with the embodiment described above, the maintenance device 30 includes the cap 72 which is to be fitted to the nozzle surface 14F of the inkjet head 12, the air supply port 72NA provided in the cap 72, and the suppression member 73 provided at least between the air supply port 72NA and the nozzle surface 14F. The suppression member 73 is separate from the air supply port 72NA and also separate from the nozzle surface 14F. The first clearance G1 is provided between the suppression member 73 and the air supply port 72NA, and the second clearance G2 is provided between the suppression member 73 and the nozzle surface 14F. According to this embodiment, the wetted air WA can be kept from making direct contact with the nozzle surface 14F.

Also according to the maintenance device 30 complying with the above embodiment, the suppression member 73 is formed from resin. According to this embodiment, condensations of wetted air WA can be suppressed.

Also according to the inkjet recording apparatus complying with the above embodiment, the inkjet recording apparatus includes the inkjet head 12, and the maintenance device 30. According to this embodiment, viscosity increases of ink within the nozzles 14N of the inkjet heads 12 can be suppressed.

Second Embodiment

Figure 17:
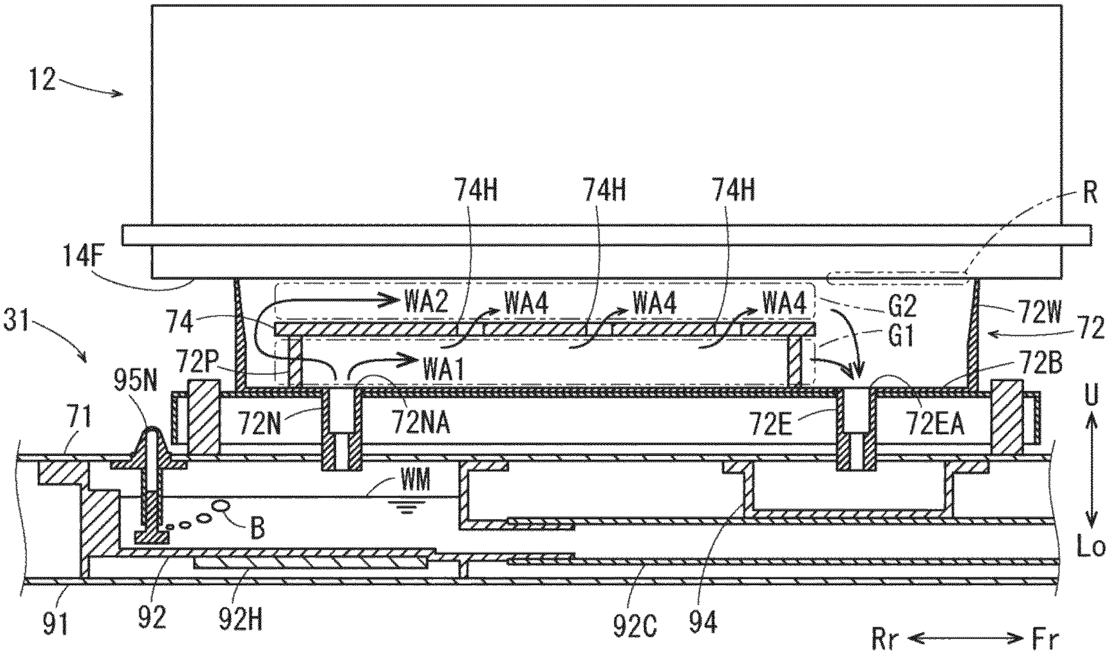
FIG. 17 is a sectional view showing a cap unit equipped with a suppression member according to a second embodiment of the disclosure.
Figure 18:
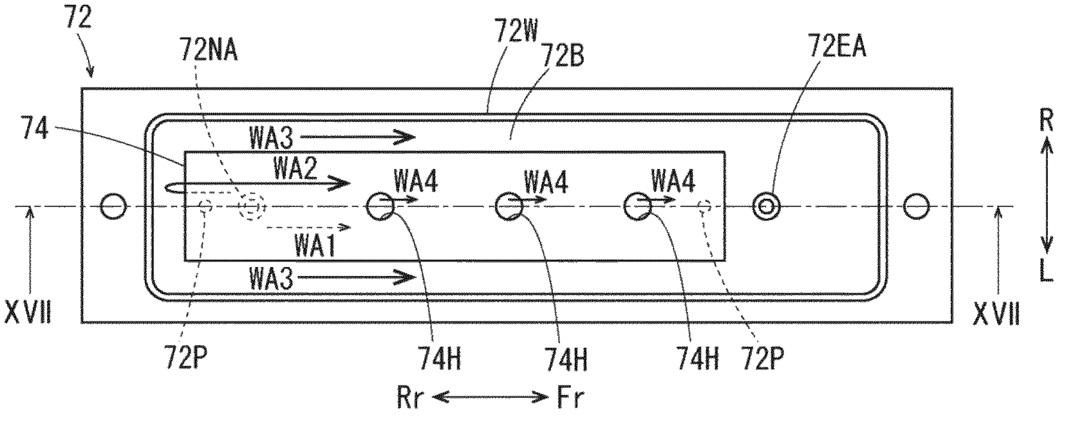
FIG. 18 is a plan view showing a cap equipped with a suppression member according to the second embodiment of the disclosure.

FIG. 17 is a sectional view showing a cap unit 31 equipped with a suppression member 74 according to a second embodiment of the disclosure. FIG. 18 is a plan view showing a cap 72 equipped with the suppression member 74 according to the second embodiment. In addition, FIG. 17 is a sectional view showing a XVII-XVII cross section of FIG. 18.

The suppression member 74 is provided along a direction from the air supply port 72NA side toward the air discharge port 72EA side. More specifically, the suppression member 74 is a plate-shaped member of such a rectangular shape whose longitudinal direction is along the direction from the air supply port 72NA side toward the air discharge port 72EA side. The suppression member 74 is supported by a pillar 74P provided at the bottom portion 72B of the cap 72. A rear end portion of the suppression member 74 is placed above the air supply port 72NA. A fore end portion of the suppression member 74 is placed rearward of the air discharge port 72EA. The suppression member 74 is separate from the air supply port 72NA and also separate from the nozzle surface 14F. A first clearance G1 is provided between the air supply port 72NA and a lower surface of the suppression member 74. A second clearance G2 is provided between the nozzle surface 14F and an upper surface of the suppression member 74.

The suppression member 74 includes a through hole 74H which is placed so as not to be opposed to the air supply port 72NA and which is bored through from the air supply port 72NA side to the nozzle surface 14F side. The through hole 74H is provided at plural (three in this embodiment) places along a direction from the air supply port 72NA side toward the air discharge port 72EA side.

One portion WA1 of wetted air (see FIG. 17) having flowed through the air supply port 72NA into the cap 72 flows forward through the first clearance G1, being sucked into the air discharge port 72EA. Another portion WA2—of wetted air, passing from the first clearance G1 through behind the suppression member 74, goes around to the second clearance G2, flowing forward from the second clearance G2 so as to be sucked into the air discharge port 72EA. Another portion WA3 of wetted air (see FIG. 18) flows forward through left/right spaces of the suppression member 74, being sucked into the air discharge port 72EA. That is, since wetted air WA flows along the lower surface and upper surface of the suppression member 74 over a wider range than in the first embodiment, the wetted air WA can be kept from direct contact with the nozzle surface 14F over a wider range than in the first embodiment.

Further, a portion WA4 of wetted air flowing from the first clearance G1 to the air discharge port 72EA flows through the through hole 74H from the first clearance G1 to the second clearance G2. As a result of this, supply deficiency of the wetted air WA by the suppression member 74 can be compensated. Furthermore, since wetted air WA is supplied through the through hole 74H also to the nozzle surface 14F separated from the air supply port 72NA, humidification uniformity for the nozzle surface 14F is improved.

According to the maintenance device 30 complying with the embodiment described above, the cap 72 includes the air discharge port 72EA, and the suppression member 74 is provided along a direction from the air supply port 72NA side toward the air discharge port 72EA side. According to this embodiment, the wetted air WA can be kept from making direct contact with the nozzle surface 14F over a wide range directed from the air supply port 72NA side toward the air discharge port 72EA side.

Also according to the maintenance device 30 complying with this embodiment, the suppression member 74 includes the through hole 74H which is placed so as not to be opposed to the air supply port 72NA and which is bored through from the air supply port 72NA side to the nozzle surface 14F side. According to this embodiment, supply deficiency of the wetted air WA by the suppression member 74 can be compensated.

Also according to the maintenance device 30 complying with this embodiment, the cap 72 includes the air discharge port 72EA, and the through hole 74H is provided at plural places along the direction from the air supply port 72NA side toward the air discharge port 72EA side. According to this embodiment, humidification uniformity for the nozzle surface 14F can be improved.

Third Embodiment

Figure 19:
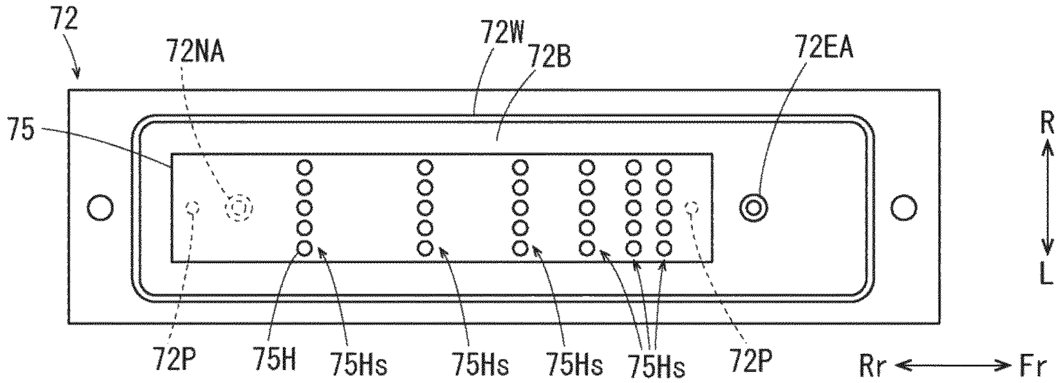
FIG. 19 is a plan view showing a cap equipped with a suppression member according to a third embodiment of the disclosure.

FIG. 19 is a plan view showing a cap 72 equipped with a suppression member 75 according to a third embodiment. The maintenance device 30 according to this embodiment includes the cap 72 to be fitted to the nozzle surface 14F of the inkjet head 12, the air supply port 72NA and the air discharge port 72EA both provided in the cap 72, and the suppression member 75 provided at least between the air supply port 72NA and the nozzle surface 14F. The suppression member 75 is separate from the air supply port 72NA and also separate from the nozzle surface 14F. A first clearance G1 is provided between the suppression member 75 and the air supply port 72NA. A second clearance G2 is provided between the suppression member 75 and the nozzle surface 14F. The suppression member 75 includes plural through holes 75H which are placed so as not to be opposed to the air supply port 72NA and which are bored through from the air supply port 72NA side to the nozzle surface 14F side. The plurality of through holes 75H are equal in diameter thereamong. The number of through holes 75H per unit area increases more and more with increasing nearness to the air discharge port 72EA.

In more detail, through hole groups 75Hs including the plurality of through holes 75H are provided at plural places along a direction from the air supply port 72NA side toward the air discharge port 72EA side. The distance between neighboring through hole groups 75Hs becomes shorter and shorter with increasing nearness to the air discharge port 72EA. In addition, although the number of through holes 75H included in each through hole group 75Hs is five in FIG. 19, the number of through holes 75H included in each through hole group 75Hs may be any arbitrary number.

According to this embodiment, humidification uniformity for the nozzle surface 14F can be improved as compared with cases where the number of through holes 75H per unit area is equal. Also according to this embodiment, humidification uniformity for the nozzle surface 14F can be improved as compared with cases where the plural through hole groups 75Hs are provided with equal intervals in a direction from the air supply port 72NA side toward the air discharge port 72EA side.

Fourth Embodiment

Figure 20:
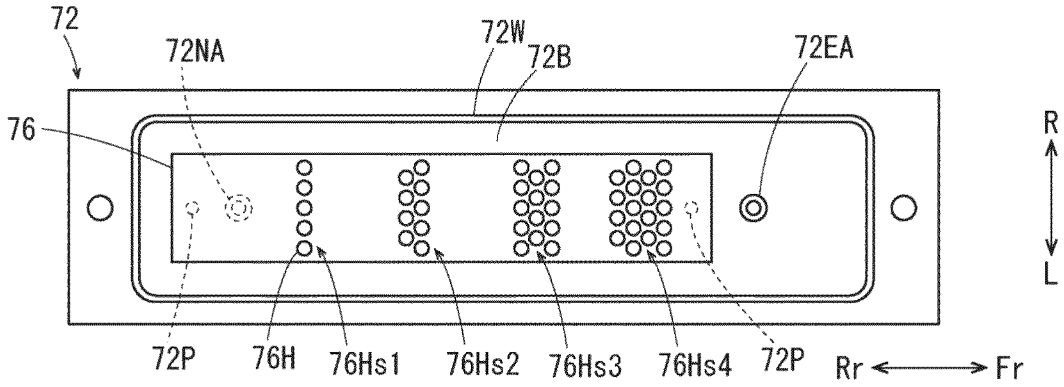
FIG. 20 is a plan view showing a cap equipped with a suppression member according to a fourth embodiment of the disclosure.

FIG. 20 is a plan view showing a cap 72 equipped with a suppression member comparator 76 according to a fourth embodiment. In the maintenance device 30 according to this embodiment, through hole groups 76Hs1, 76Hs2, 76Hs3, and 76Hs4 each including plural through holes 76H are provided at plural places in a direction from the air supply port 72NA side toward the air discharge port 72EA side, where the number of through holes 76H included in each of the through hole groups 76Hs1, 76Hs2, 76Hs3, and 76Hs4 becomes larger with increasing nearness to the air discharge port 72EA.

In the case of FIG. 20, the through hole group 76Hs1 includes five through holes 76H. The through hole group 76Hs2 includes nine through holes 76H. The through hole group 76Hs3 includes fourteen through holes 76H. The through hole group 76Hs4 includes eighteen through holes 76H. In this example, when the number of through holes 76H included in each of the through hole groups 76Hs1, 76Hs2, 76Hs3 and 76Hs4 is larger than five, the through holes 76H are arranged in a staggered pattern, but the plural through holes 76H may be arranged in any arbitrary way in each of the through hole groups 76Hs1, 76Hs2, 76Hs3 and 76Hs4. Also in FIG. 20, the distance between every neighboring two of the through hole groups 76Hs1, 76Hs2, 76Hs3 and 76Hs4 becomes shorter with increasing nearness to the air discharge port 72EA, but the distance between every neighboring two of the through hole groups 76Hs1, 76Hs2, 76Hs3 and 76Hs4 may be constant. According to this embodiment, humidification uniformity for the nozzle surface 14F can be improved as compared with cases where the same number of through holes 76H are included in each of the plural through hole groups 76Hs1, 76Hs2, 76Hs3 and 76Hs4.

Fifth Embodiment

Figure 21:
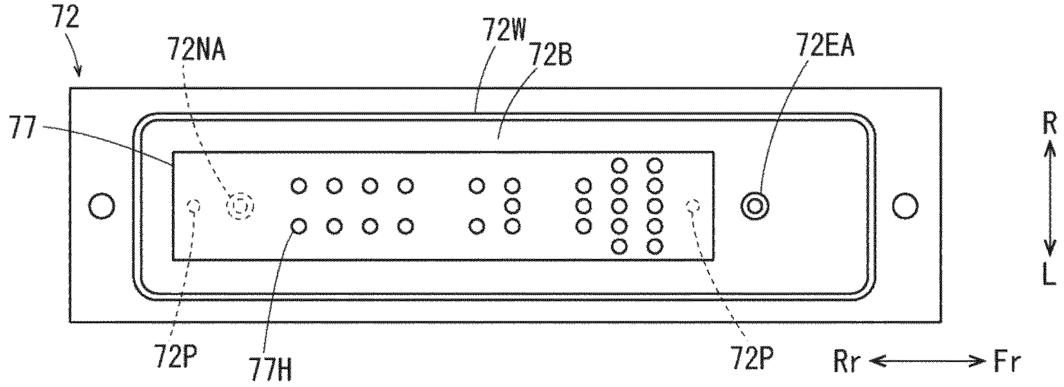
FIG. 21 is a plan view showing a cap equipped with a suppression member according to a fifth embodiment of the disclosure.

FIG. 21 is a plan view showing a cap 72 equipped with a suppression member 77 according to a fifth embodiment. Whereas the arrangement of through holes 77H differs from those of the third and fourth embodiments, this embodiment is so configured that plural through holes 77H are equal in diameter thereamong and the number of through holes 77H per unit area becomes larger and larger with increasing nearness to the air discharge port 72EA. Also in this embodiment, humidification uniformity for the nozzle surface 14F can be improved as compared with cases where the number of through holes 77H per unit area keeps equal thereamong.

Sixth Embodiment

Figure 22:
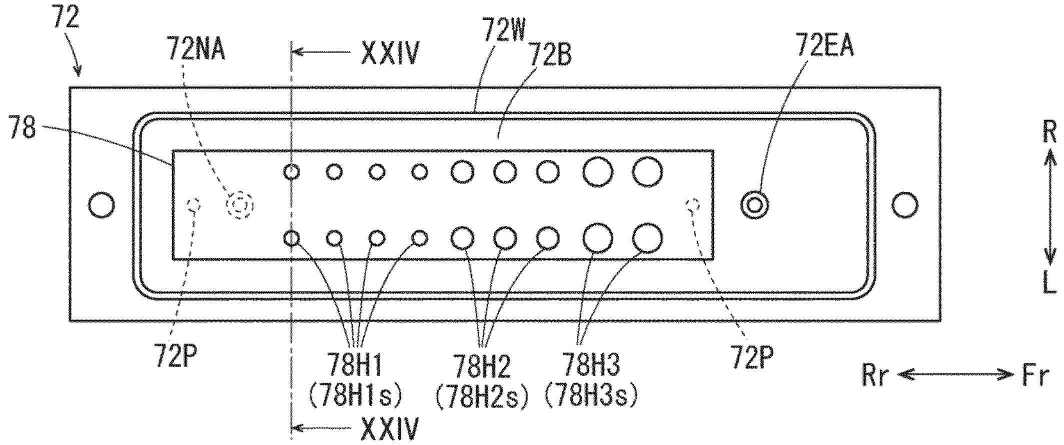
FIG. 22 is a plan view showing a cap equipped with a suppression member according to a sixth embodiment of the disclosure.

FIG. 22 is a plan view showing a cap 72 equipped with a suppression member 78 according to a sixth embodiment.

The maintenance device 30 according to this embodiment includes the cap 72 to be fitted to the nozzle surface 14F of the inkjet head 12, the air supply port 72NA and the air discharge port 72EA both provided in the cap 72, and the suppression member 78 provided at least between the air supply port 72NA and the nozzle surface 14F. The suppression member 78 is separate from the air supply port 72NA and also separate from the nozzle surface 14F. A first clearance G1 is provided between the suppression member 78 and the air supply port 72NA. A second clearance G2 is provided between the suppression member 78 and the nozzle surface 14F. The suppression member 78 includes plural through holes 78H1, 78H2 and 78H3 each of which is placed so as not to be opposed to the air supply port 72NA and which are bored through from the air supply port 72NA side to the nozzle surface 14F side, where the through holes 78H1, 78H2 and 78H3 become larger in diameter with increasing nearness to the air discharge port 72EA.

More specifically, the through hole group 78H1*s* includes plural through holes 78H1, the through hole group 78H2*s* includes plural through holes 78H2, and the through hole group 76H3*s* includes plural through holes 76H3. The through hole groups 78H1*s*, 78H2*s* and 78H3*s* are provided at plural places along a direction from the air supply port 72NA side toward the air discharge port 72EA side. The through holes 78H1, 78H2 and 78H3 included in the through hole groups 78H1*s*, 78H2*s* and 78H3*s*, respectively, become larger in diameter with increasing nearness to the air discharge port 72EA. According to this embodiment, humidification uniformity for the nozzle surface 14F can be improved as compared with cases where the through holes 78H1, 78H2 and 78H3 included in the through hole groups 78H1*s*, 78H2*s* and 78H3*s*, respectively, are equal in diameter.

Figure 24:
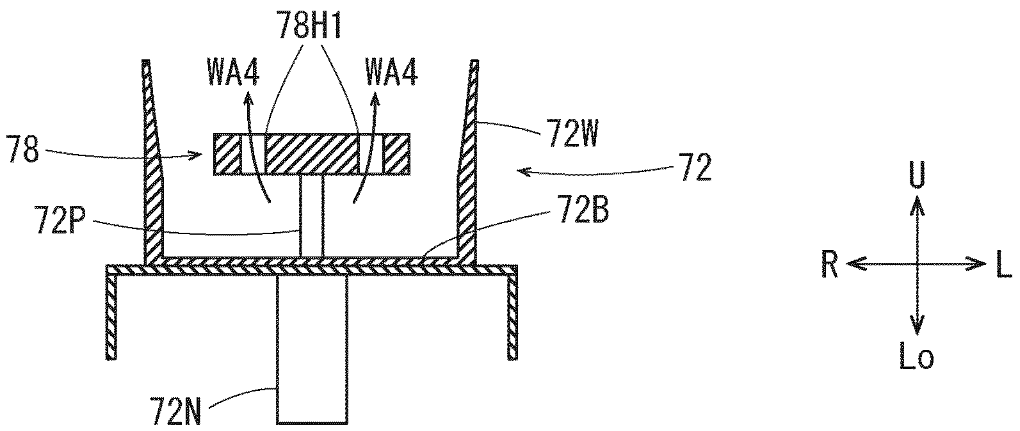
FIG. 24 is a sectional view showing a XXIV-XXIV cross section of FIG. 22.

FIG. 24 is a sectional view showing a XXIV-XXIV cross section of FIG. 22. The suppression member 78 is provided along a direction from the air supply port 72NA side toward the air discharge port 72EA side, and the plural through holes 78H1, 78H2 and 78H3 are provided on both-end sides of the suppression member 78 in a widthwise direction (left/right direction) intersecting with the direction from the air supply port 72NA side toward the air discharge port 72EA side. The plural through holes 78H1, 78H2 and 78H3 are bored through from bottom face to upper face of the suppression member 78. According to this embodiment, humidification uniformity for the nozzle surface 14F in the widthwise direction (left/right direction) can be improved as compared with cases where the through holes 78H1, 78H2 and 78H3 are provided at centers in the widthwise (left/right direction).

Figure 25:
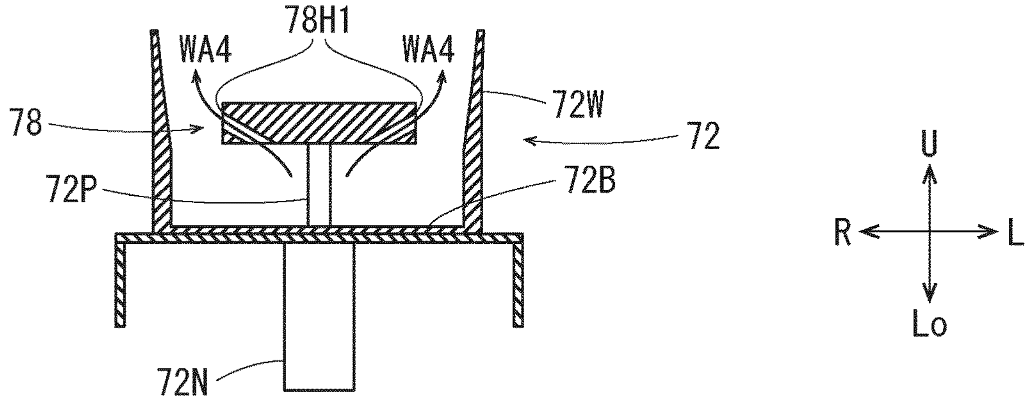
FIG. 25 is a sectional view showing a first modification of the sixth embodiment of the disclosure.

FIG. 25 is a sectional view showing a first modification of the sixth embodiment. Plural through holes 78H1, 78H2 and 78H3 are bored through from bottom face to side face of the suppression member 78. Also in this embodiment, humidification uniformity for the nozzle surface 14F in the widthwise direction can be improved.

Figure 26:
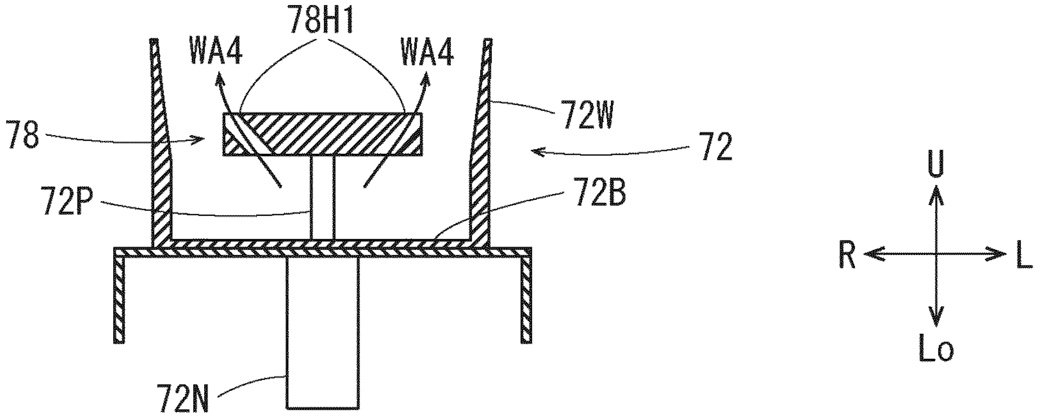
FIG. 26 is a sectional view showing a second modification of the sixth embodiment of the disclosure.

FIG. 26 is a sectional view showing a second modification of the sixth embodiment. Plural through holes 78H1, 78H2 and 78H3 are bored through from the bottom face of the suppression member 78 to ridge portions where the upper face and the side face intersect each other. Also in this embodiment, humidification uniformity for the nozzle surface 14F in the widthwise direction can be improved.

Seventh Embodiment

Figure 23:
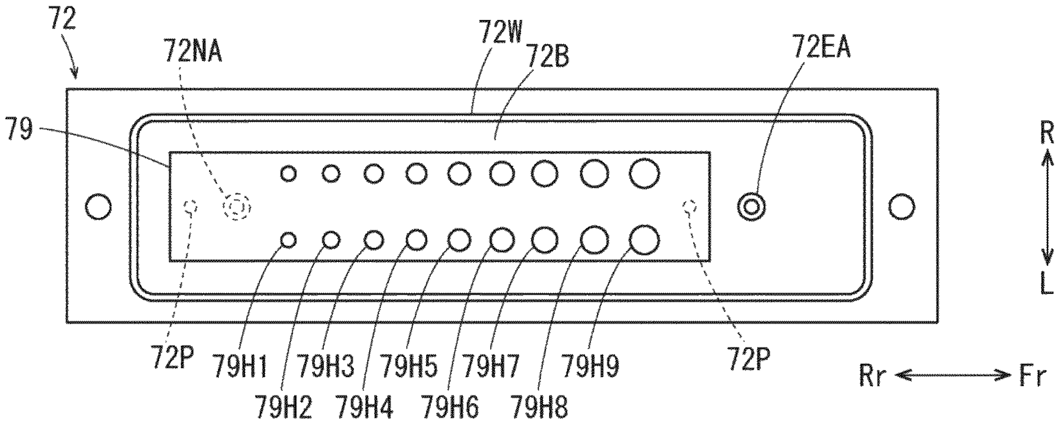
FIG. 23 is a plan view showing a cap equipped with a suppression member according to a seventh embodiment of the disclosure.

FIG. 23 is a plan view showing a cap 72 equipped with a suppression member 79 according to a seventh embodiment. In this embodiment, the through holes 79H1, 79H2, 79H9 are made gradually larger in diameter with increasing nearness to the air discharge port 72EA. Also in this embodiment, humidification uniformity for the nozzle surface 14F can be improved.

Eighth Embodiment

Figure 27:
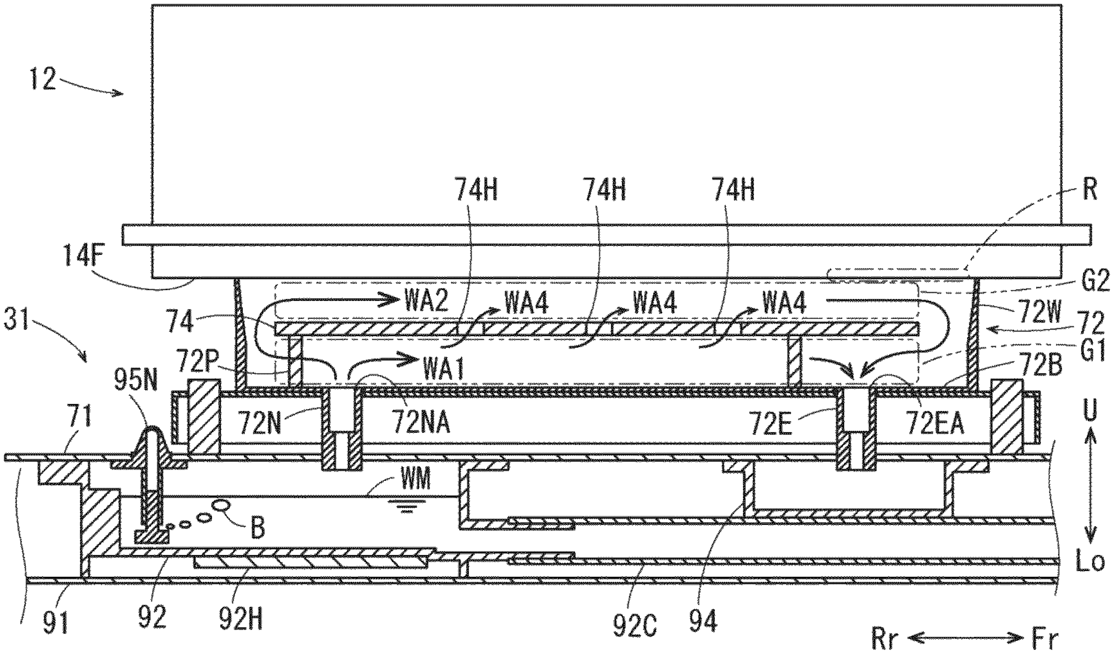
FIG. 27 is a sectional view showing a cap unit equipped with a suppression member according to an eighth embodiment of the disclosure.
Figure 28:
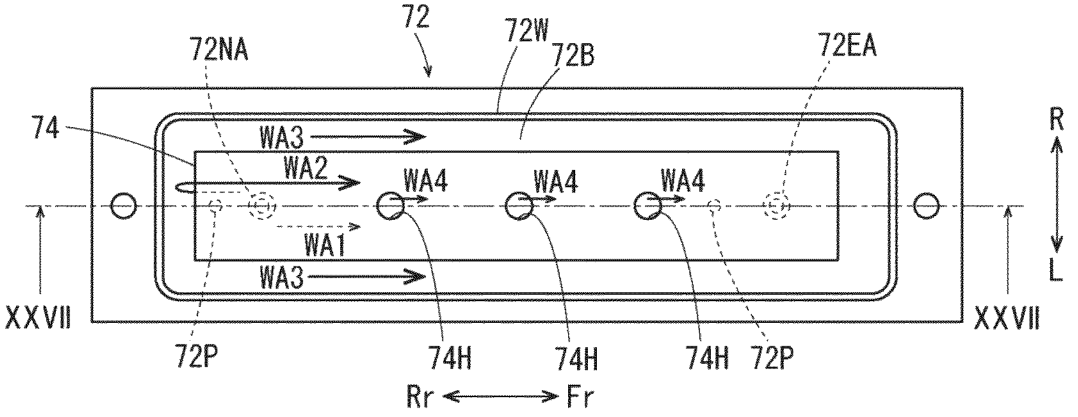
FIG. 28 is a plan view showing a cap equipped with a suppression member according to the eighth embodiment.

FIG. 27 is a sectional view showing a cap unit 31 equipped with a suppression member 74 according to an eighth embodiment. FIG. 28 is a plan view showing a cap 72 equipped with a suppression member 74 according to the eighth embodiment. In the second embodiment (see FIG. 17), since an end portion of the suppression member 74 on one side closer to the air discharge port 72EA is placed rearward of the air discharge port 72EA, there has been a problem that, on the nozzle surface 14F, wetted air WA is less likely to be supplied to a region R forward of one end portion of the suppression member 74 on the air discharge port 72EA side.

Accordingly, in this embodiment, the suppression member 74 is opposed to the air discharge port 72EA. More specifically, an end portion of the suppression member 74 on the air discharge port 72EA side (i.e., part of the suppression member 74) is opposed to the air discharge port 72EA. Therefore, the suppression member 74 is provided so as to cover the air discharge port 72EA. The suppression member 74 is separate from the air discharge port 72EA. According to this embodiment, since wetted air WA flowing forward in the second clearance G2 goes around to the first clearance G1 from forward of the suppression member 74 so as to be sucked into the air discharge port 72EA, wetted air WA can be supplied also to the nozzle surface 14F on the air discharge port 72EA side. Thus, according to this embodiment, humidification uniformity for the nozzle surface 14F can be improved.

According to the present disclosure, while wetted air is kept from direct contact with the nozzle surface, humidification uniformity for the nozzle surface can be improved.

What is claimed is:

1. A maintenance device comprising:

a cap which includes an air supply port and an air discharge port, and which is to be fitted to a nozzle surface of an inkjet head; and a suppression member which is opposed to the air supply port, and which is provided between the air supply port and the nozzle surface, and moreover which is separate from the air supply port and also separate from the nozzle surface, wherein wetted air flows through the air supply port into the cap, the suppression member is provided above the air supply port so as to cover the whole air supply port, as viewed in a plan view and suppresses generation of condensations on the nozzle surface, the suppression member includes a plurality of through holes which are placed so as not to be opposed to the air supply port, and which are bored through from the air supply port side to the nozzle surface side, and the through holes become larger in diameter with increasing nearness to the air discharge port.

2. The maintenance device according to claim 1, wherein the suppression member is formed from resin.

3. The maintenance device according to claim 1, wherein the suppression member is opposed to the air discharge port.

4. An inkjet recording apparatus comprising:
an inkjet head, and
the maintenance device according to claim 1.

5. A maintenance device comprising:
a cap which includes an air supply port and an air discharge port, and which is to be fitted to a nozzle surface of an inkjet head; and
a suppression member which is opposed to the air supply port, and which is provided between the air supply port and the nozzle surface, and moreover which is separate from the air supply port and also separate from the nozzle surface,
wherein
wetted air flows through the air supply port into the cap,
the suppression member is provided above the air supply port so as to cover the whole air supply port, as viewed in a plan view and suppresses generation of condensations on the nozzle surface,
the suppression member includes a plurality of through holes which are placed so as not to be opposed to the air supply port, and which are bored through from the air supply port side to the nozzle surface side,
through hole groups each of which includes the plurality of through holes are provided at plural places along a direction ranging from the air supply port toward the air discharge port, and
the through holes included in the through hole groups, respectively, become larger in diameter with increasing nearness to the air discharge port.

6. The maintenance device according to claim 5, wherein
the suppression member is formed of resin.

7. The maintenance device according to claim 5, wherein
the suppression member is opposed to the air discharge port.

8. An inkjet recording apparatus comprising:
an inkjet head, and
the maintenance device according to claim 5.

9. A maintenance device comprising:
a cap which includes an air supply port and an air discharge port, and which is to be fitted to a nozzle surface of an inkjet head; and
a suppression member which is opposed to the air supply port, and which is provided between the air supply port and the nozzle surface, and moreover which is separate from the air supply port and also separate from the nozzle surface,
wherein
wetted air flows through the air supply port into the cap,
the suppression member is provided above the air supply port so as to cover the whole air supply port, as viewed in a plan view and suppresses generation of condensations on the nozzle surface,
the suppression member includes a plurality of through holes which are placed so as not to be opposed to the air supply port, and which are bored through from the air supply port side to the nozzle surface side,
the through holes become larger in number per unit area with increasing nearness to the air discharge port.

10. The maintenance device according to claim 9, wherein
the suppression member is formed of resin.

11. The maintenance device according to claim 9, wherein
the suppression member is opposed to the air discharge port.

12. An inkjet recording apparatus comprising:
an inkjet head, and
the maintenance device according to claim 9.

13. A maintenance device comprising:
a cap which includes an air supply port and an air discharge port, and which is to be fitted to a nozzle surface of an inkjet head; and
a suppression member which is opposed to the air supply port, and which is provided between the air supply port and the nozzle surface, and moreover which is separate from the air supply port and also separate from the nozzle surface,
wherein
wetted air flows through the air supply port into the cap,
the suppression member is provided above the air supply port so as to cover the whole air supply port, as viewed in a plan view and suppresses generation of condensations on the nozzle surface,
the suppression member includes a plurality of through holes which are placed so as not to be opposed to the air supply port, and which are bored through from the air supply port side to the nozzle surface side,
the suppression member is provided along a direction ranging from the air supply port side toward the air discharge port side, and
the plurality of through holes are provided on both-end sides of the suppression member in a widthwise direction crossing the direction ranging from the air supply port side toward the air discharge port side.

14. The maintenance device according to claim 2, wherein
the plurality of through holes are bored through from bottom face of the suppression member to upper face, side face, or ridge portion where the upper face and the side face cross each other.

15. The maintenance device according to claim 13, wherein
the suppression member is formed of resin.

16. The maintenance device according to claim 13, wherein
the suppression member is opposed to the air discharge port.

17. An inkjet recording apparatus comprising:
an inkjet head, and
the maintenance device according to claim 13.

* * * * *